United States Patent [19]
Marks et al.

[11] Patent Number: 5,622,611
[45] Date of Patent: Apr. 22, 1997

[54] ELECTROFORMED MULTILAYER FLOW REGULATOR INCORPORATING FORCE-GENERATING MEANS FOR SELECTIVELY CONSTRICTING THE FLUID FLOW PATH, AND A PROCESS FOR THE PREPARATION THEREOF

[75] Inventors: Gary T. Marks, Phelps; James H. McVeigh, Webster; Judy A. Sline, Romulus; Kenneth E. Wood, Macedon, all of N.Y.; Lawrence W. Evers, Lake Linden, Mich.

[73] Assignee: Amtx, Inc., Canandaigua, N.Y.

[21] Appl. No.: 653,928

[22] Filed: May 22, 1996

[51] Int. Cl.$^6$ ........................... C25D 1/00
[52] U.S. Cl. ................ 205/67; 205/50; 239/102.2
[58] Field of Search ................ 205/67, 75, 50; 239/533.13, 102.2, 602; 347/47

[56] References Cited

U.S. PATENT DOCUMENTS

| | | |
|---|---|---|
| 3,297,260 | 1/1967 | Barlow ........................... 239/533.15 |
| 3,567,125 | 3/1971 | Houghton ........................... 239/204 |
| 4,229,265 | 10/1980 | Kenworthy . |
| 4,246,076 | 1/1981 | Gardner . |
| 4,586,226 | 5/1986 | Fakler et al. . |
| 4,635,849 | 1/1987 | Igashira ........................... 239/102.2 |
| 4,675,083 | 6/1987 | Bearss et al. . |
| 4,716,423 | 12/1987 | Chan et al. . |
| 4,839,001 | 6/1989 | Bakewell . |
| 4,902,386 | 2/1990 | Herbert et al. . |
| 4,915,983 | 4/1990 | Lake et al. . |
| 4,954,225 | 9/1990 | Bakewell . |
| 4,972,204 | 11/1990 | Sexton . |
| 5,167,776 | 12/1992 | Bhaskar et al. . |
| 5,359,928 | 11/1994 | Blessington et al. . |

FOREIGN PATENT DOCUMENTS 0435437A  7/1991  European Pat. Off. .

OTHER PUBLICATIONS

M. Zanini et al., "Silicon Microstructures: Merging Mechanics with Microelectronics", Sensors and Activators, Society of American Engineers, Special Publication No. 903, SAE Paper 920472 (1992). No month available.

W. P. Richardson, "The Influence of Upstream Flow Conditions on the Atomizing Performance of a Low Pressure Port Fuel Injector", Thesis for Master of Science in Mechanical Engineering, Michigan Technological University, 1991. No month available.

*Primary Examiner*—Kathryn L. Gorgos
*Assistant Examiner*—Brendan Mee
*Attorney, Agent, or Firm*—Oliff & Berridge

[57] ABSTRACT

A zero sack volume fluid flow regulator generates upstream turbulence for control of fluid flow, fluid spray distribution and fluid droplet size. The fluid flow regulator includes a seal layer for selectively controlling fluid flow. The seal layer is resiliently movable relative to a base layer to selectively constrict a turbulence inducing intermediate channel within the regulator and selectively control fluid flow. A method of fabricating the fluid flow regulator utilizes a multilayer resist process in conjunction with a multilayer electroforming process.

22 Claims, 3 Drawing Sheets

ELECTROFORMED MULTILAYER FLOW REGULATOR INCORPORATING FORCE-GENERATING MEANS FOR SELECTIVELY CONSTRICTING THE FLUID FLOW PATH, AND A PROCESS FOR THE PREPARATION THEREOF

FIELD OF THE INVENTION

This invention relates to a flow regulator incorporating upstream turbulence generation and force-generating means for control of fluid flow. Fluid flow regulators according to this invention include, but are not limited to, spray directors (e.g., nozzles and fuel injectors), check valves, flow control regulators and the like. The invention also relates to a method of fabricating a flow regulator utilizing a multilayer resist process in conjunction with a multilayer electroforming process.

BACKGROUND

Flow regulators with small, precision orifices are employed in numerous industrial applications, including, for example, fuel injectors in internal combustion automotive engines and rocket engines, thermal ink jet printheads, and in similar services requiring the precise metering of a fluid.

Conventional methods for fabricating flow regulators include casting from a mold, machining, and electroplating. Further, these methods may require a finishing step to produce the final product.

Electroplating methods for fabricating flow regulators employ various combinations of dry and liquid resists, and etching. Such methods are limited, however, in that the maximum electroformed layer thickness achievable is approximately 200 microns.

Prior art methods of fabricating flow regulators have generally suffered from a lack of precision in orifice generation. Until now, such methods have comprised joining discrete components to form flow regulators.

For example, William P. Richardson, Michigan Technological University Master's Thesis: "The Influence of Upstream Flow Conditions on the Atomizing Performance of a Low Pressure Fuel Injector" (1991), discloses nozzles produced by a process of Silicon MicroMachining (SMM). In this process, orifice configuration is provided by silicon etching.

U.S. Pat. No. 4,586,226 to Fakler et al. relates to a method of fabricating a small orifice fuel injector using a wax and silver technique, followed by post-finishing. A first layer of Ni is electrodeposited on a stainless steel base plate, in which fuel feed passages are formed. Connecting bores to the perforations are made through a face plate Ni layer. Plastic mandrels are fabricated having legs with support sections, orifice forming sections and coupling tabs for tying the legs together. The support sections of the mandrels are set into acceptor holes formed in the face plate and a bonded layer of rigid material is built up by electrodeposition to enclose the orifice forming sections. The sections of the mandrels extending outside the bonded layer are removed and the surface is smoothly finished.

U.S. Pat. No. 4,246,076 to Gardner relates to a multilayer dry film plating method for fabricating nozzles for ink jet printers. The process comprises the steps of coating a first layer of a photopolymerizable material on a substrate, and exposing the layer to a pattern of radiation until at least a portion of the layer of photo-polymerizable material polymerizes. A free surface of the first layer is coated with a second layer of a photopolymerizable material, the process being analogous to the process associated with the deposition of the first layer. Both the layers are developed to remove non-polymerized material from the substrate followed by metallic deposition on the substrate by electroplating.

U.S. Pat. No. 4,229,265 to Kenworthy discloses a thick dry film resist plating technique for fabricating an orifice plate for a jet drop recorder. A sheet of stainless steel is coated on both sides with a photoresist material. The photoresist is then exposed through suitable masks and developed to form cylindrical photoresist peg areas on both sides of the sheet. Nickel is then plated on the sheet until the height thereof covers the peg edges. A larger diameter photoresist plug is then formed over each photoresist peg. Nickel plating is then continued until the height is level with the plug. The photoresist and plate are then dissolved and peeled from the nickel forming two solid homogeneous orifice plates.

U.S. Pat. No. 4,675,083 to Bearss et al. relates to a method of manufacturing metal nozzle plates associated with an ink jet printhead by using a two-step resist and plating process. The method comprises the steps of providing a first mask on a metal substrate that includes a first plurality of mask segments and providing a second mask including a second plurality of segments formed atop the first plurality of segments. This structure is then transferred to an electroforming station wherein a layer of nickel is formed on exposed surfaces up to a thickness of about 2.5 mils. Once the plate is completed to a desired thickness, negative and positive photoresist mask segments are removed using conventional photoresist liftoff processes.

U.S. Pat. No. 4,954,225 to Bakewell relates to a method for electroforming nozzle plates having three-dimensional features. The method employs a dry film over liquid, and a thick film photoresist. A conductive coating is applied to a surface of a transparent mandrel using photolithographic techniques. A pattern of thin, circular masked areas of a non-conductive, transparent material is formed over each hole formed in the opaque, conductive coating. A layer of first metal is plated onto the conductive coating on the transparent mandrel. A layer of second metal is plated over the first metal layer until the first layer of the second metal surrounds, but does not cover, the photoresist posts. Depressions caused in the metal layers are filled with fillers to create smooth continuous surface on the top of the plate layers. A thick layer of photoresist is then applied over the top of the smooth plated layers and cured so as to form a pattern of thick photoresist discs covering and in registration with the filled depressions. The plated layers are then separated from the transparent mandrel and the extraneous material is stripped using suitable stripping techniques.

U.S. Pat. No. 4,839,001 to Bakewell relates to a method of fabrication of an orifice plate using a thick film photoresist in which the plate is constructed from two electroformed layers of nickel. A first layer of Ni is electroformed onto a conductive mandrel to form a support layer with a selected hole pattern. Copper is plated over the Ni to cover the holes. A second layer of Ni is electroformed onto the surface that is joined to the mandrel in such a way as to form an orifice layer with a pattern of smaller holes of selected cross section in alignment with the pattern of holes of the first nickel layer. The copper is then etched away to reveal a thin orifice plate of Ni.

U.S. Pat. No. 4,716,423 to Chan et al. relates to a process employing the application of a first liquid and then a dry film for the manufacture of an integrated orifice plate. The process consists of forming a first mask portion having a convergently contoured external surface and a second mask portion having straight vertical walls. A first metal layer is electroformed around the first mask portion to define an orifice plate layer and electroforming of the second metal layer is done around the second mask portion to define a barrier layer of discontinuous and scalloped wall portions having one or more ink reservoir cavities. Finally, the first and second masks, and selected portions of metallic substrate, are removed, thereby leaving intact the first and second metal layers in a composite configuration.

U.S. Pat. No. 4,902,386 to Herbert et al. relates to a cylindrical electroforming mandrel and a thick film photoresist method for fabricating and using the same.

U.S. Pat. No. 5,167,776 to Bhaskar et al. discloses an orifice or nozzle plate for an ink jet printer that may be produced by a process comprising providing electroplating over the conductive regions and over a portion of the insulating regions of a mandrel to form a first electroformed layer having convergent orifice openings corresponding to the insulating regions. The electroplating process may be repeated once to form a second electroformed layer on the first electroformed layer, said second layer having convergent orifice openings aligned with those of the first layer.

U.S. Pat. No. 4,972,204 to Sexton discloses an orifice plate for an ink jet printer produced by a multilayer electroforming process comprising the steps of forming resist pegs on a substrate and electroplating onto said substrate a first metal layer complementary to said resist pegs, allowing the metal to slightly overgrow the top surface of the resist pegs and form a first electroformed layer. A first resist layer in the form of a channel wider than the resist pegs is placed on the resist pegs and the first electroformed layer. A second electroformed layer is formed around the first resist layer and on the first electroformed layer. A series of resist layers of ever-increasing width and electroformed layers of ever-decreasing width are subsequently layered onto the nascent orifice plate in like fashion to eventually form an orifice plate having orifices opening into a channel that progressively widens upstream from the orifices.

Copending U.S. application Ser. No. 08/371,118, filed Jan. 11, 1995, discloses multilayered fluid dispersant spray directors incorporating structure producing upstream turbulence generation, and multilayer resist processes for producing such spray directors.

Prior art fluid regulators have been known to suffer from the drawbacks of downstream "dead space" or "sack volume" during periods of inactivity. When fluid flow through such flow regulators is stopped, residual fluid remains within the cavities of the flow regulators. This residual fluid may leak from the flow regulators at inopportune times, thus causing various problems. For example, prior art engine fuel injectors have suffered from residual fuel leakage during the non-injecting part of the engine cycle, leading to, e.g., diminished efficiency and increased emission of hydrocarbon pollutants.

Another problem known to be related to residual fluid being retained in the dead space of prior art flow regulators having non-zero sack volume has been the tendency of certain residual fluids to clog the flow regulators when retained within the dead space for a sufficient amount of time to coagulate.

The above references are incorporated herein by reference in their entireties.

SUMMARY OF THE INVENTION

Embodiments of the present invention are directed to a multilayered flow regulator incorporating structure producing upstream turbulence generation for control of fluid distribution and droplet size, and force-generating means for selectively constricting at least a portion of the fluid flow path to eliminate dead space and provide a zero (or near zero) sack volume flow regulator. The fluid flow path in the turbulence generation channel is defined by a space between first and second layers of the multilayered regulator. The second layer is resiliently movable relative to the first layer and can assume at least two positions:

an open position in which the second layer is spaced from the first layer to define a turbulence inducing intermediate channel and permit fluid flow therethrough, and a closed position in which the second layer contacts at least a portion of the first layer to occupy at least a portion of the space otherwise defining the intermediate channel and prohibit fluid flow.

In certain embodiments, the second layer can also assume an intermediate or constricted position in which the second layer moves toward the first layer to constrict the turbulence inducing intermediate channel and reduce, but not stop, an amount of fluid flow therethrough.

The force-generating means selectively applies a force to the second layer to move it among the positions to selectively constrict and/or close the fluid flow path.

Methods for fabricating a flow regulator as described above are also disclosed. One method provides for the fabrication of a flow regulator using a multilayer resist process in conjunction with a multilayer electroforming process. A pattern of resist complementary to a pattern of the cross-section of the flow regulator is applied to a conductive substrate, followed by the electroforming of a patterned layer onto the substrate. The resist application process and electroforming process are repeated at least once to produce a multilayered electroformed flow regulator.

A resulting structure of the flow regulator includes multiple electroformed layers, in which at least one fluid entry orifice is formed in at least one top (or base) layer of the multiple electroformed layers, at least one fluid ejection orifice is formed in at least one base (or top) layer of the multiple electroformed layers, and a turbulence-inducing channel connects said at least one entry orifice with said at least one ejection orifice. The turbulence-inducing channel is structured such that it causes the direction of the fluid entering through the at least one entry orifice to change prior to being ejected from the at least one ejection orifice. That is, the turbulence-inducing channel conveys fluid from the at least one entry orifice to the at least one ejection orifice in a nonlinear manner.

According to one preferred embodiment, a plurality of entry orifices and an ejection orifice are laterally offset from each other (i.e., offset in a direction perpendicular to the direction in which the central axes of the entry and ejection orifices extend), and the turbulence-inducing channel extends in the direction perpendicular to the axes of the orifices. Thus, in this embodiment, the fluid enters the entry orifices flowing in a direction parallel to the entry orifices' axes, enters the turbulence-inducing channel where the flow direction changes by approximately 90°, flows through the turbulence-inducing channel to the ejection orifice, and changes direction again by approximately 90° upon being ejected through the ejection orifice.

This type of flow path creates turbulence in the fluid, which improves the atomization and spray distribution of the ejected fluid.

The force-generating means can be attached to the top layer by any suitable means, including, but not limited to, laser welding, soldering, diffusion bonding, or adhesive bonding.

Other features and advantages of embodiments of the present invention will become more fully apparent from the following detailed description of preferred embodiments, the appended claims, and the accompanying drawings.

BRIEF DESCRIPTION OF THE DRAWINGS

The invention will be described in conjunction with the following drawings in which like reference numerals designate like elements and wherein:

FIG. 3A shows an open flow state. FIG. 3B shows a partially constricted flow state. FIG. 3C shows a completely constricted flow (i.e., a closed or non-flow) state.

DETAILED DESCRIPTION OF PREFERRED EMBODIMENTS

Figure 1A:
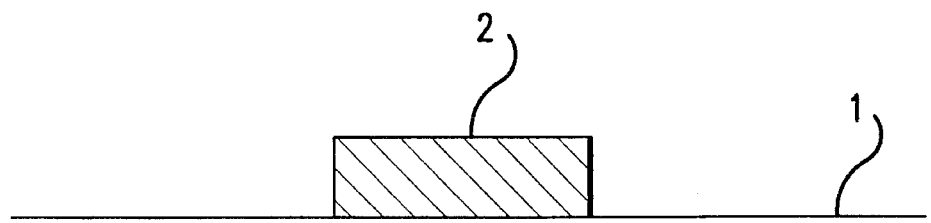
FIGS. 1A through 1D are cross-sectional views illustrating certain stages of the production of a flow regulator having a turbulence-inducing fluid path, in accordance with an embodiment of the invention.

A method according to the invention provides for electroforming multiple layers of metal, with each layer ranging from about 0.025 mm to about 0.250 mm in thickness. The method produces smooth, planar, and flat surfaces without requiring any additional finishing step. No lapping, grinding, forming, or machining is necessary to obtain flatness and planarity. That is not to say that flatness and planarity are not advantageous or not achievable with the invention, but rather, that the part can be produced so that lack of flatness and planarity are not a hindrance in operation, since each layer is a true replication of the previous layer. Any nonconformance is automatically compensated for.

The method produces a flow regulator with orifice dimensions and fluid pathway characteristics desirable for applications requiring the precise metering of a fluid, such as, for example, a fuel injector nozzle. The turbulence-inducing channel improves atomization and fluid distribution of the ejected fluid, which is particularly advantageous for fuel injection nozzles.

The invention, however, is not limited to fuel injection nozzles. The invention also can be used in, for example, paint spray applications, cosmetic spray applications, household or industrial cleaner dispensing applications, or any other applications in which fluid atomization and spray pattern control are desired. The invention is also suitable for use as a check valve and use in applications in which the elimination of sack volume is desired. For applications in which fluid atomization is not an issue, the turbulence-inducing intermediate channel need not be included in the flow regulator.

A pattern of resist, which is complementary to a desired flow regulator cross section, is prepared for the electroforming process with an appropriate phototool design. Phototool designs are commonly used in the art.

For example, a line drawing in the nature of a design for a flow regulator cross-section is made on a piece of paper, such that dark lines correspond to the final design desired to be imprinted. The lines are separated by non-image bearing areas. A positive or negative phototool of the original artwork is prepared using conventional photographic processes. The phototool for a negative resist has clear lines corresponding to the lines of the original artwork and darkened areas corresponding to the areas between the lines. As is known by those of skill in the art, a phototool used for a positive resist would have these areas reversed, i.e., the lines would be dark and the areas between the lines would be clear.

A conductive substrate is first cleaned by methods well known to those of skill in the art to prepare it for the application of a pattern of resist. The sequence of cleaning steps can include washing with isopropyl alcohol, vapor degreasing in trichloroethylene, electrocleaning, rinsing in distilled water, washing in nitric acid, and final rinsing in distilled water. Typical substrate materials include stainless steel, iron plated with chromium or nickel, nickel, copper, titanium, aluminum, aluminum plated with chromium or nickel, titanium palladium alloys, nickel-copper alloys such as Inconel® 600 and Invar® (available from Inco, Houston, Tex.), and the like. Non-metallic substrates can also be used if they have been made conductive, for example, by being appropriately metallized using known metallization techniques, such as electroless metallization, vapor deposition, and the like. The substrate can be of any suitable shape. For example, if cylindrical, the surface of the substrate should be substantially parallel to the axis of the substrate.

The resist materials can include various types of liquid resists. As is well known, these resist materials can be classified as either positive, such as Microposit® or Photoposit®, obtainable from Shipley, Inc. (Newton, Mass.) or negative, such as Waycoat Resists obtainable from OCG Microelectronics, Inc. (Saddle Brook, NJ; Tempe, Ariz.). These liquid resists are either aqueous processable or solvent processable in commonly employed organic solvents such as benzene, dichloromethane, trichloroethane, and the like. The positive resist materials include solvent processable resists containing 2-ethoxyethyl acetate, n-butyl acetate, xylene, o-chlorotoluene, toluene, blends of novolak resins, and photoactive compounds. The negative resist materials include solvent processable resists containing cyclized polyisoprene and diazido photoinitiators.

In the case of a negative resist, for example, the phototool is tightly secured to the surface of the resist coated substrate. For example, the substrate is irradiated with actinic radiation at an energy level of about 100 mJ/cm$^2$ to 2,000 mJ/cm$^2$. The phototool is removed leaving portions of the resist that were exposed to the UV radiation polymerized and portions of the resist that were not irradiated in semi-solid form. The resist layer is developed on the substrate with conventional developing equipment and chemistry. Those portions of the resist that were not irradiated are washed away in the development process, leaving only the polymerized portions remaining on the surface of the substrate. In the case of positive resist systems, irradiated areas are washed away and non-irradiated areas remain after the development process.

Figure 1B:
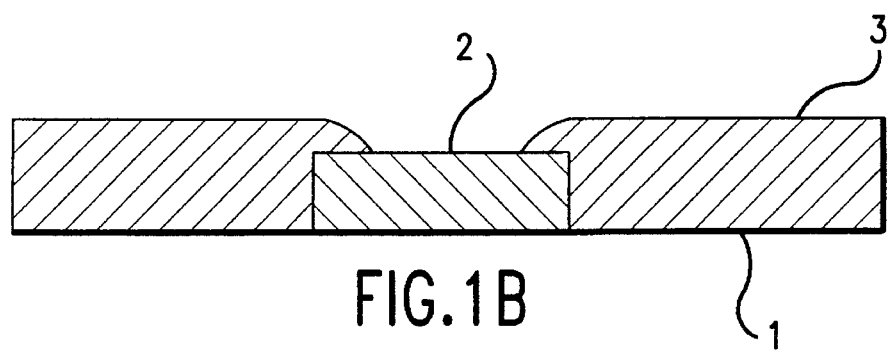

Throughout the figures, like numbers represent like parts. As depicted in FIGS. 1A and 1B, a first patterned layer 3 is electroformed on the substrate 1 bearing a first resist pattern 2. The shapes of the first patterned layer 3 and first resist pattern 2 may be selected from any shapes that produce a desired effect on the fluid flow, fluid particle size and/or the directionality of fluid spray. Exemplary shapes include those that are circular, oblong, egg-shaped, toroid, cylindrical, polygonal, triangular, rectangular, square, regular and irregular.

The electroforming process takes place within an electroforming zone comprising an anode, a cathode, and an electroforming bath. The bath may be composed of: ions or salts of ions of the patterned layer-forming material, the concentration of which can range from trace to saturation, where the ions can be in the form of anions or cations; a solvent; a buffering agent, the concentration of which can range from zero to saturation; an anode corrosion agent, the concentration of which can range from zero to saturation; and, optionally, grain refiners, levelers, catalysts, surfactants, and other additives known in the art. The preferred concentration ranges may be established by those of skill in the art without undue experimentation.

A preferred electroforming bath to plate nickel (i.e., as the first patterned layer 3) on a substrate comprises about 80 mg/ml of nickel ion in solution, about 20–40 mg/ml of $H_3BO_3$, about 3.0 mg/ml of $NiCl_2 \cdot 6H_2O$ and about 2.5–6.0 ml/liter of sodium lauryl sulfate. Other suitable electroforming bath compositions include, but are not limited to, Watts nickel: about 68–88 mg/ml of nickel ion, about 50–70 mg/ml of $NiCl_2 \cdot 6H_2O$ and about 20–40 mg/ml of $H_3BO_3$; chloride sulfate: about 70–100 mg/ml of nickel ion, about 145–170 mg/ml of $NiCl_2 \cdot 6H_2O$ and about 30–45 mg/ml $H_3BO_3$; and concentrated sulfamate: about 100–120 mg/ml of nickel ion, about 3–10 mg/ml of $NiCl_2 \cdot 6H_2O$ and about 30–45 mg/ml of $H_3BO_3$. Electroless baths such as electroless nickel baths can also be employed. Various types are available depending upon the properties required in the electroform deposition. These electroless baths are well known to those skilled in the art.

Examples of metals that can be electroformed onto the surface of a substrate include, but are not limited to, nickel, copper, gold, silver, palladium, tin, lead, chromium, zinc., cobalt, iron, and alloys thereof. Preferred metals are nickel and copper. Any suitable conductor or material that can be electrochemically deposited can be used, such as conductive polymers, plastics, and electroless nickel deposits. Examples of suitable autocatalytic electroless nickel deposits include, but are not limited to, nickel-phosphorus, nickel-boron, poly-alloys, such as copper-nickel phosphorus, nickel-polytetrafluoroethylene, composite coatings, and the like. Methods of preparing electroless nickel deposits employed within the scope of this invention are well known to those skilled in the art of electroforming.

The electrolytic bath is energized using a suitable electrical source. Patterned layer-forming ions from the solution are electroformed on the exposed conductive surfaces of the substrate 1 determined by the pattern of polymerized resist 2. Those portions of the substrate covered with the resist remain unplated. The process is allowed to proceed until a first patterned layer 3 has deposited on the exposed surface of the substrate 1 to a desired thickness ranging from about 0.010 mm to about 0.400 mm, and preferably ranging from about 0.020 mm to about 0.200 mm. As depicted in the figures, this thickness can exceed the thickness of the first resist pattern 2, producing overgrowth geometry. In a layer having this geometry, electroplated material overlaps edges of the first resist pattern 2 to partially define a nonlinear fluid flow path. This type of structure occurs when the resist material is a liquid resist and/or the first resist pattern 2 is thin relative to the first patterned layer 3. The thickness of the first resist pattern 2 should be 0.002 mm to 0.300 mm, preferably 0.005 mm to 0.250 mm, more preferably 0.040 mm to 0.200 mm.

Resist materials that can be employed to form overgrowth geometry include, but are not limited to, those liquid resists typically containing 2-ethoxyethyl acetate, n-butyl acetate, xylene, o-chlorotoluene, toluene, and photoactive compounds and blends of photoactive compounds. Examples of photoactive compounds include, but are not limited to, diazo-based compounds or diazodi-based compounds.

Figure 1C:
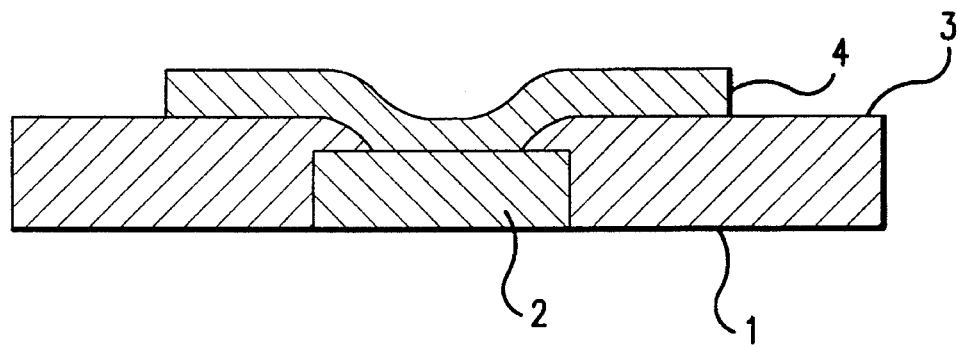
Figure 1D:
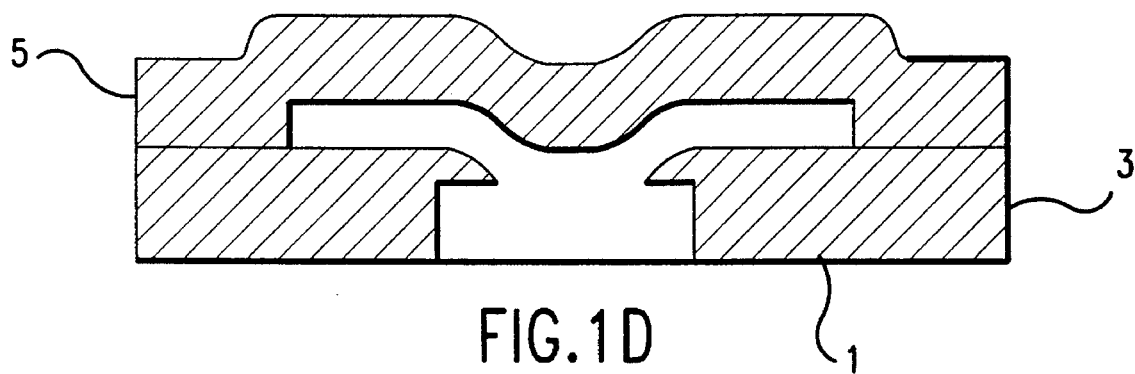

FIGS. 1C and 1D depict another cycle of resist application and electroplating. FIG. 1D depicts a multilayer electroformed flow regulator after removal of the resist patterns. A second resist pattern 4 is provided on top of the first resist pattern 2 and over part of the first patterned layer 3. A metallic layer (not illustrated) is coated on top of the second resist pattern 4 to enable electroforming to take place over the non-conductive second resist pattern 4. The metallic layer can also coat the first patterned layer 3. The metallic layer can be applied by any of the numerous metallization techniques known to those of ordinary skill in the art, such as, e.g., evaporative Physical Vapor Deposition (PVD), sputtering PVD and autocatalytic electroless deposition. Suitable components of the metallic layer include, but are not limited to, Au, Ag, Ni, Pd, Ti, Fe, Cu, Al and Cr. The thickness of the metallic layer should be 0.00001 mm to 0.020 mm, preferably 0.00005 mm to 0.005 mm.

The electrolytic bath is energized and patterned layer-forming ions from the solution are electroformed on the metallic layer in a pattern complementary to the second resist pattern 4. The process is continued until a second patterned layer 5 is deposited on the metallic layer to a desired thickness ranging from about 0.050 mm to about 0.300 mm, and preferably ranging from about 0.075 mm to about 0.250 mm. The range of suitable thicknesses for the second resist pattern 4 is from about 0.010 mm to about 0.250 mm, and preferably from about 0.050 mm to about 0.150 mm.

The shapes of the second patterned layer 5 and second resist pattern 4 may be any suitable shape that produces a desired effect on the fluid flow, fluid particle size and/or the directionality of fluid spray. Exemplary shapes include those that are circular, oblong, egg-shaped, toroid, cylindrical, polygonal, triangular, rectangular, square, regular and irregular.

After the desired multilayer thickness is electroformed on the surface of the substrate 1, the substrate is removed from the solution. The multilayer electroformed pattern can be removed from the surface of the substrate by standard methods that include, but are not limited to, mechanical separation, thermal shock, mandrel dissolution, and the like. These methods are well known to those of skill in the electroforming art.

The resist patterns and any metallic layer present in the flow path are preferably removed before removal of the substrate, in order to minimize parts handling. Resist patterns can be removed by any suitable method known in the art. Such methods include washing the substrate in acetone or dichloromethane for solvent processible resists, or blends of ethanolamine and glycol ethers for aqueous processible resists. Other suitable methods of removing photoresist are known in the art and are typically provided by suppliers of photoresist material.

Any metallic layer present in the flow path can be removed by any suitable method known in the art, and is preferably removed along with the resist patterns in the above-described methods of removing the resist patterns.

In multiple layer structures, a post-substrate removal cleaning step is usually necessary. Typically, this step can be accomplished by tumbling the parts in, e.g., acetone, dichloromethane, or blends of ethanolamine and glycol esters.

Although FIGS. 1A–1D depict embodiments in which the resist pattern and patterned layer defining the ejection orifice are the first applications to the substrate, those of ordinary skill in the art will readily appreciate that the process could be reversed, such that the resist patterns and patterned layer defining the entry orifices would be the first applications to the substrate (i.e., the base layer), and the resist pattern and patterned layer defining the ejection orifice would be the last applications to the nascent flow regulator (i.e., the top layer). An example of such an alternative embodiment comprises: applying onto a conductive substrate a first resist pattern having a shape corresponding to a shape of at least one entry orifice; electroforming onto the conductive substrate a first patterned layer complementary to the first resist pattern; applying onto a first surface defined by the first patterned layer and the first resist pattern a second resist pattern having a shape corresponding to a shape of an intermediate channel; electroforming onto the first surface a second patterned layer complementary to the second resist pattern; applying a metallic layer onto a second surface defined by the second resist pattern and the second patterned layer; applying onto the metallic layer a third resist pattern having a shape corresponding to the shape of an ejection orifice; electroforming onto the metallic layer a third patterned layer complementary to the third resist pattern, to provide a multilayered electroformed pattern; removing the resist patterns and a portion of the metallic layer located in a nonlinear fluid pathway from the multilayered electroformed pattern; and removing the multilayered electroformed pattern from the substrate to provide a flow regulator.

Figure 3A:
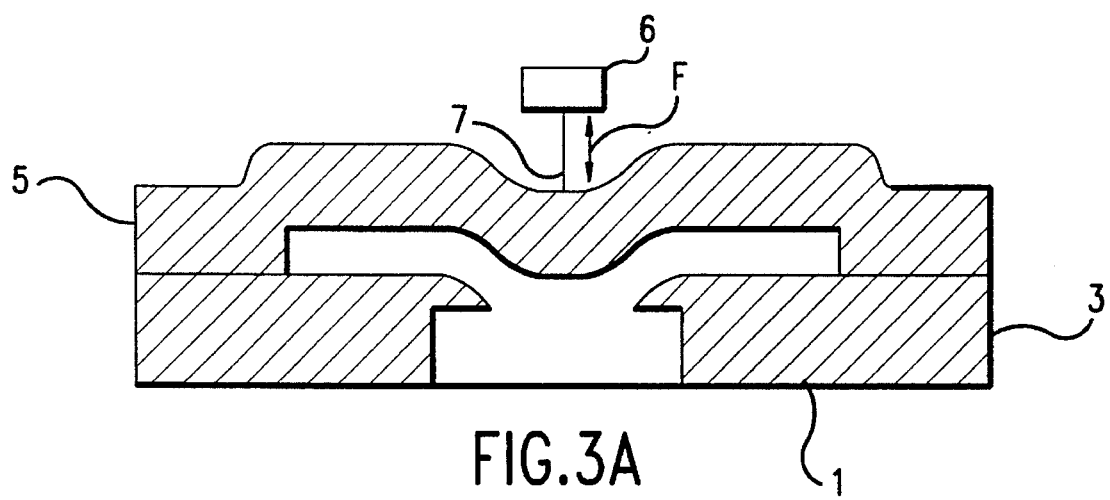
FIGS. 3A–3C are cross-sectional views through an embodiment of the invention in different fluid flow states.
Figure 3B:
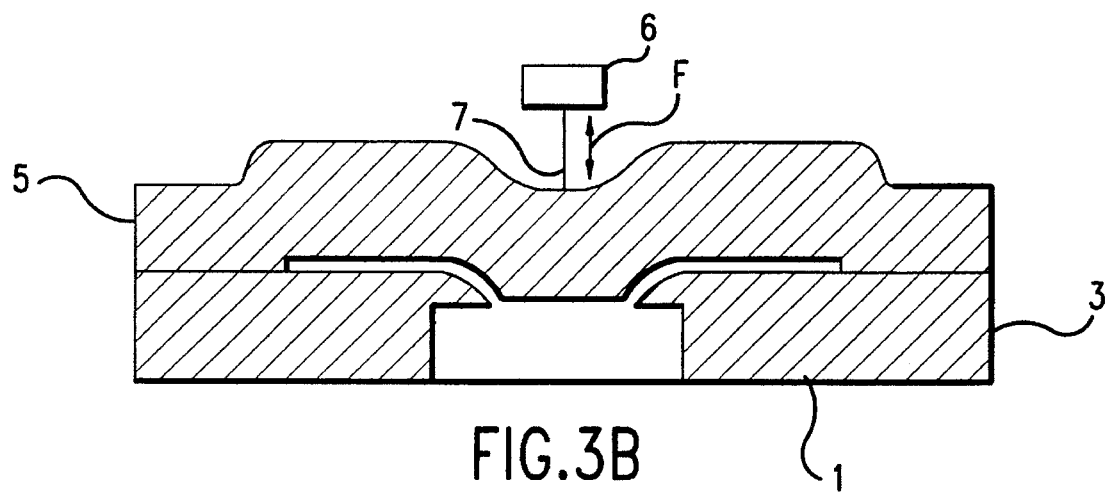
Figure 3C:
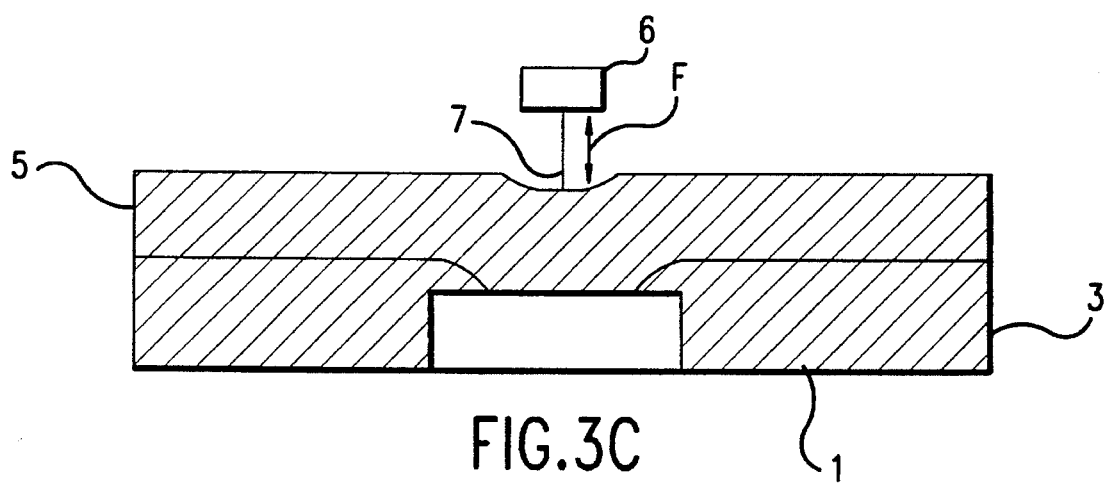

As illustrated in FIGS. 3A–3C, force-generating means 6 can be applied to the flow regulator, before or after removal from the substrate 1, with the latter being the preferred method. The force-generating means 6 can be attached directly or indirectly to the resiliently movable layer 5, for example, via a post 7, so as to be capable of selectively generating force along axis F. The force-generating means 6 can be attached to the resiliently movable layer 5 by any suitable means, including, but not limited to, laser welding, soldering, diffusion bonding and adhesive bonding.

With diffusion bonding (not illustrated), a layer of material having a lower melting point than the material of the resiliently movable layer 5 can be applied to the resiliently movable layer in a thickness sufficient to diffusion bond to an appropriate post or structure that is attached or attachable to force-generating means. The thickness of the lower melting point material layer can be, for example, about 0.020 mm to 0.075 mm. If, for example, the material of the resiliently movable layer 5 is nickel, then the lower melting point diffusion bonding layer could be, for example, copper, zinc or tin.

Diffusion bonding is a preferred method of attaching the force-generating means to the resiliently movable layer 5, since the lower-melting point material for diffusion bonding can be electrodeposited during the formation of the electroformed layers, facilitating mass production of the invention.

Figure 2A:
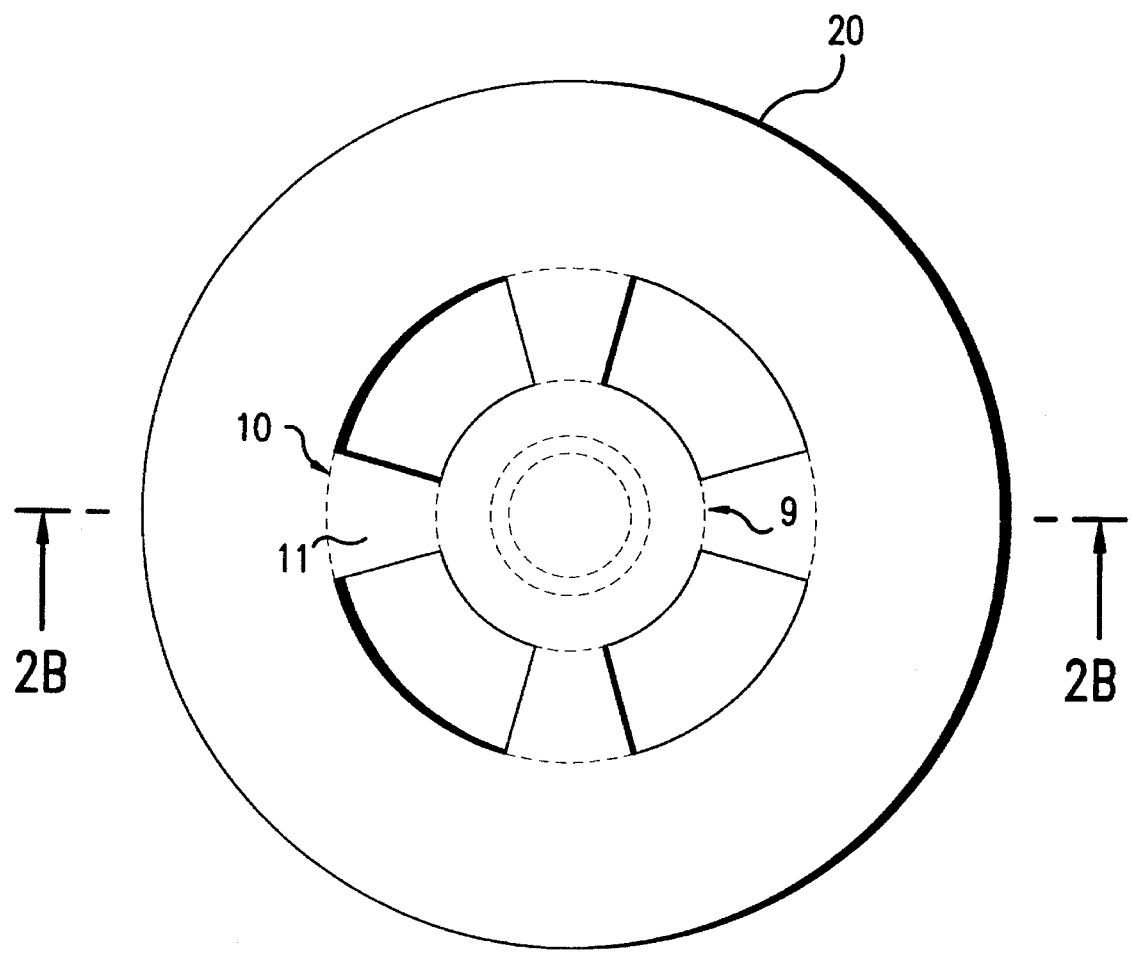
FIG. 2A is a front view of a flow regulator, in accordance with an embodiment of the invention.
Figure 2B:
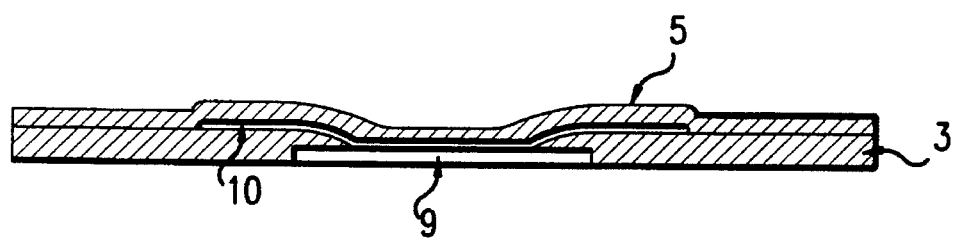
FIG. 2B is a cross-sectional view through line 2B—2B of FIG. 2A.

FIGS. 2A–2B depict an embodiment of a flow regulator 20 after the substrate and photoresist material have been removed.

In the open state of FIGS. 2A, 2B and 3A, a fluid to be dispersed flows into the fluid dispersant flow regulator 20 through the four entry orifices 11 and into an intermediate channel 10. An internal surface of the first patterned layer 3 interrupts the linear flow of the fluid, forcing the fluid to undergo a turbulence inducing angular fluid path transition prior to exiting the intermediate channel 10 and spraying through the fluid ejection orifice 9. In the illustrated embodiment, channel 10 extends in a direction substantially perpendicular to axes defined by the entry orifices 11 and the ejection orifice 9. In FIGS. 3A–3C, force-generating means 6 may be employed to apply a force to the second electroformed layer 5 for deflecting an annular portion of the second electroformed layer 5 toward the first electroformed layer 3, thereby selectively constricting (FIG. 3B) and/or closing (FIG. 3C) the intermediate channel 10 to reduce and/or stop fluid flow from the entry orifices 11 through the ejection orifice 9.

Suitable force-generating means 6 can include a mechanical device, such as a spring, and/or an electromechanical device, such as a solenoid or piezoelectric device. These devices may be employed alone, or in conjunction with other force-generating means, such as the forward and/or back, fluid and/or vapor pressure associated with the fluid and/or vapor being passed through the fluid flow regulator. Alternatively, the foregoing non-mechanical force-generating means may be employed independently of mechanical force-generating means to selectively close the flow regulator, for example, in a fluid flow check valve.

The force-generating means 6, such as, e.g., a solenoid or piezoelectric device, may be affixed to the second electroformed (or "seal") layer 5 and used to selectively close the well-defined annular ring creating a zero (or near zero) sack volume fluid seal. For example, in a fuel injector according to the invention, when fuel is needed, the solenoid, piezoelectric device or equivalent is actuated to restore a defined opening that can be controlled through a feedback loop. The fuel shut-off is at a point of emission, resulting in no residual fuel leakage during the non-injecting part of the cycle. This also has the advantage of creating a non-clogging spray nozzle, as the seal is at the point of emission, which is especially useful for regulation of coagulable fluids.

This and other embodiments can also be used as a check valve, for example, by applying a spring (not illustrated) to the second electroformed layer 5. The spring is used to close the well-defined annular ring to create a zero (or near zero) sack volume seal. When the fluid or vapor pressure exceeds a predetermined force exerted by the spring, the check valve opens to allow fluid and/or vapor flow. A similar configuration can also be used to prevent fluid reflux (i.e., reverse flow).

Embodiments as depicted in FIGS. 2A and 2B may be further modified by applying a mechanical drive to the second electroformed layer 5. A solenoid or piezoelectric device can be affixed to the top layer, for example, by laser welding, soldering, diffusion bonding or adhesive bonding, and is used to close the well-defined annular ring creating an essentially zero sack volume seal. When flow is needed, the solenoid or equivalent is actuated for a given displacement creating an opening controlled through a feedback loop to maintain a constant flow rate or constant pressure.

A major advantage provided by the invention is that all the critical interfacing parts may be defined and built as an integral unit, thus saving substantial costs in tooling and assembly. Moreover, the replication of the preceding layer by the succeeding layer ensures good fit, and automatically compensates for any structural non-uniformity.

The flow regulator prepared according to the invention can have a range of cross-sectional diameters and thicknesses. For example, the fluid ejection orifices of a flow regulator can have a minimum cross-sectional dimension from about 0.050 mm to about 0.500 mm, preferably from about 0.100 mm to about 0.300 mm. The dimensions of the fluid ejection orifice 9 are guided by fluid flow requirements, and vary widely depending on the application and pressure drop requirement across the flow regulator. These dimensions may be determined by one of ordinary skill in the art without undue experimentation.

The dimensions of the photoresist on the substrate and electroformed layers, and the electroforming time, determine the dimensions of the flow regulator. The multilayer thickness of the flow regulator should be about 0.075 mm to about 0.550 mm. A preferred thickness ranges from about 0.125 mm to about 0.460 mm. Variations from these exemplary ranges may be readily made by those of skill in the art.

More than one fluid ejection orifice 9 can be provided in each flow regulator 20. One entry orifice 11 can be provided in each flow regulator 20. Alternatively, two, three, four (as in FIGS. 2A and 2B) or more entry orifices 11 and/or fluid ejection orifices 9 can be provided in each flow regulator 20.

The number of patterned layers in a flow regulator is not limited to two (as in FIGS. 2A and 2B). More than two patterned layers can be provided, for example, to facilitate the formation of more intricate cavities, orifices, flow paths, and the like. For example, additional layers may be provided to facilitate the formation of grooves, fins or ribs on the downstream wall of the intermediate channel, which structures further impact fluid flow.

The axes of the entry and ejection orifices need not be parallel, nor perpendicular to the intermediate channel, as long as sufficient turbulence is generated in the fluid for embodiments in which good fluid spray dispersion is desirable.

A plurality of flow regulators may be simultaneously fabricated on a single substrate. To allow the parts to be removed from the substrate as a continuous sheet and to facilitate handling of the array, thin coupling strips may be electroformed to affix the final electroformed layer of each flow regulator pattern to at least one other of the flow regulator patterns. The distance between the flow regulators in the array pattern may vary widely, with the goal being to minimize the space.

Flow regulators prepared according to the invention can be employed in applications requiring flow regulators with precision orifices, such as the precise metering of a fluid. Such uses include, but are not limited to, fuel injector nozzles for use in internal combustion engines, printing nozzles for thermal ink jet printing, drop on demand printing and piezoelectric drive printing; spray applications, including epoxy sprays, paint sprays, adhesive sprays, cosmetic sprays, household or industrial cleaner sprays and solder paste sprays, or any other applications in which fluid atomization and spray pattern control are desired; and check valves.

For example, a fuel regulator according to the invention can be substituted for a conventional fuel injector nozzle in an otherwise conventional internal combustion engine, thereby rendering such an engine more fuel efficient- and less polluting by decreasing or eliminating residual fuel leakage during the non-injecting part of the engine cycle. The fuel injection control system of the engine can be adapted to use at least one fuel injector nozzle according to the invention to regulate the flow of fuel from the fuel supply lines to the combustion chambers. For example, the flow of fuel through the fuel injector nozzle can be regulated by having the engine computer control the magnitude and/or direction of force generated by the force-generating means to selectively constrict and/or close the fuel injector nozzle.

While the invention has been described in detail and with reference to specific embodiments thereof, it will be apparent to those of ordinary skill in the art that various changes and modifications can be made therein without departing from the spirit and scope thereof.

What is claimed is:

1. A fluid flow regulator comprising:
   at least one entry orifice that receives a fluid;
   at least one ejection orifice that ejects said fluid; and
   a turbulence inducing intermediate channel between said at least one entry orifice and said at least one fluid ejection orifice that nonlinearly conveys said fluid in a fluid flow direction from said at least one entry orifice to said at least one fluid ejection orifice, the turbulence inducing intermediate channel being defined by a space between first and second electroformed layers, wherein the second layer is electroformed on the first layer or the first layer is electroformed on the second layer and wherein the second layer is selectively resiliently movable relative to the first layer among at least two positions:
   an open position in which the second layer is spaced from the first layer to define the turbulence inducing intermediate channel and permit fluid flow therethrough, and
   a closed position in which the second layer contacts at least a portion of the first layer to occupy the space and prohibit fluid flow.

2. The fluid flow regulator according to claim 1, wherein said turbulence inducing intermediate channel is further defined by an upstream wall and a downstream wall, said upstream wall penetrated by said at least one entry orifice, and said downstream wall penetrated by said at least one fluid ejection orifice, a central axis of the at least one entry orifice and a central axis of the at least one fluid ejection orifice being non-colinear.

3. The fluid flow regulator according to claim 1, wherein said turbulence inducing intermediate channel has a circular cross-section.

4. The fluid flow regulator according to claim 1, wherein said regulator has a plurality of entry orifices and one fluid ejection orifice in selective communication with said turbulence inducing intermediate channel.

5. The fluid flow regulator according to claim 4, wherein said regulator has four entry orifices.

6. The fluid flow regulator according to claim 1, wherein said turbulence inducing intermediate channel has an axis extending in a direction substantially perpendicular to a central axis of at least one of said at least one fluid ejection orifice and said at least one entry orifice.

7. The fluid flow regulator according to claim 1, wherein said at least one fluid ejection orifice has an arcuate cross-section.

8. The fluid flow regulator according to claim 1, wherein at least one of the first and second electroformed layers has an overgrowth geometry.

9. The fluid flow regulator according to claim 1, wherein said at least one entry orifice has a cross-sectional shape selected from the group consisting of circular, oblong, toroid, polygonal, triangular, rectangular and irregular.

10. The fluid flow regulator according to claim 1, wherein said electroformed layers comprise at least one member selected from the group consisting of nickel, copper, gold, silver, palladium, tin, lead, cobalt, chromium, iron, zinc, and alloys thereof.

11. The fluid flow regulator according to claim 1, wherein said electroformed layers comprise at least one member selected from the group consisting of nickel-phosphorus, nickel-boron, copper-nickel phosphorus, nickel-polytetrafluoroethylene, and composites thereof.

12. The fluid flow regulator according to claim 1, wherein said first and second electroformed layers are formed from an identical material.

13. The fluid flow regulator according to claim 1, wherein the first and second electroformed layers are formed from different materials.

14. The fluid flow regulator according to claim 1, wherein said fluid flow regulator is a liquid fuel atomizing injector nozzle for an engine.

15. The fluid flow regulator according to claim 1, further comprising force-generating means for selectively deflecting said second electroformed layer.

16. The fluid flow regulator according to claim 15, wherein said force-generating means is selected from the group consisting of a spring, a piezoelectric device, a solenoid and fluid pressure.

17. The fluid flow regulator according to claim 1, wherein the second layer is movable between a constricted position in which the second layer is intermediate to the open and closed positions to constrict the turbulence inducing intermediate channel and reduce an amount of fluid flow therethrough.

18. A method of producing fluid flow regulator comprising at least one entry orifice that receives a fluid; at least one ejection orifice that ejects said fluid; and a turbulence inducing intermediate channel between said at least one entry orifice and said at least one fluid ejection orifice that nonlinearly conveys said fluid in a fluid flow direction from said at least one entry orifice to said at least one fluid ejection orifice, the turbulence inducing intermediate channel being defined by a space between first and second electroformed layers, wherein the second layer is electroformed on the first layer or the first layer is electroformed on the second layer, and wherein the second layer is selectively resiliently movable relative to the first layer among at least two positions: (i) an open position in which the second layer is spaced from the first layer to define the turbulence inducing intermediate channel and permit fluid flow therethrough, and (ii) a closed position in which the second layer contacts at least a portion of the first layer to occupy the space and prohibit fluid flow, said method comprising:

(a) electroforming onto a substrate a layer to define one of said at least one entry orifice and said at least one fluid ejection orifice;

(b) forming a multilayered electroformed pattern by electroforming onto said layer at least one other layer to define said intermediate channel and the other of said at least one entry orifice and said at least one fluid ejection orifice;

(c) separating said multilayered electroformed pattern from said substrate; and (d) positioning force-generating means in contact with an external one of said layers to provide said fluid flow regulator.

19. The method according to claim 18, further comprising providing resist patterns and removing said resist patterns to define said at least one entry orifice, said at least one fluid ejection orifice and said intermediate channel, wherein said resist patterns comprise at least one member selected from the group consisting of 2-ethoxyethyl acetate, n-butyl acetate, xylene, o-chlorotoluene, toluene, a photoactive compound, and blends thereof.

20. The method according to claim 18, further comprising providing resist patterns and removing said resist patterns to define said at least one entry orifice, said at least one fluid ejection orifice and said intermediate channel, wherein said resist patterns comprise at least one member selected from the group consisting of cyclized polyisoprene and diazido photoinitiators.

21. The method according to claim 18, wherein said patterned layers are formed from at least one member selected from the group consisting of nickel, copper, gold, silver, palladium, tin, lead, cobalt, chromium, iron, zinc, and alloys thereof.

22. The method according to claim 18, wherein said patterned layers are formed from at least one member selected from the group consisting of nickel-phosphorus, nickel-boron, copper-nickel phosphorus, nickel-polytetrafluoroethylene, and composites thereof.

* * * * *